May 4, 1965
B. S. FRIEDMAN
3,182,011
CRACKING A PLURALITY OF HYDROCARBON STOCKS
Filed June 5, 1961
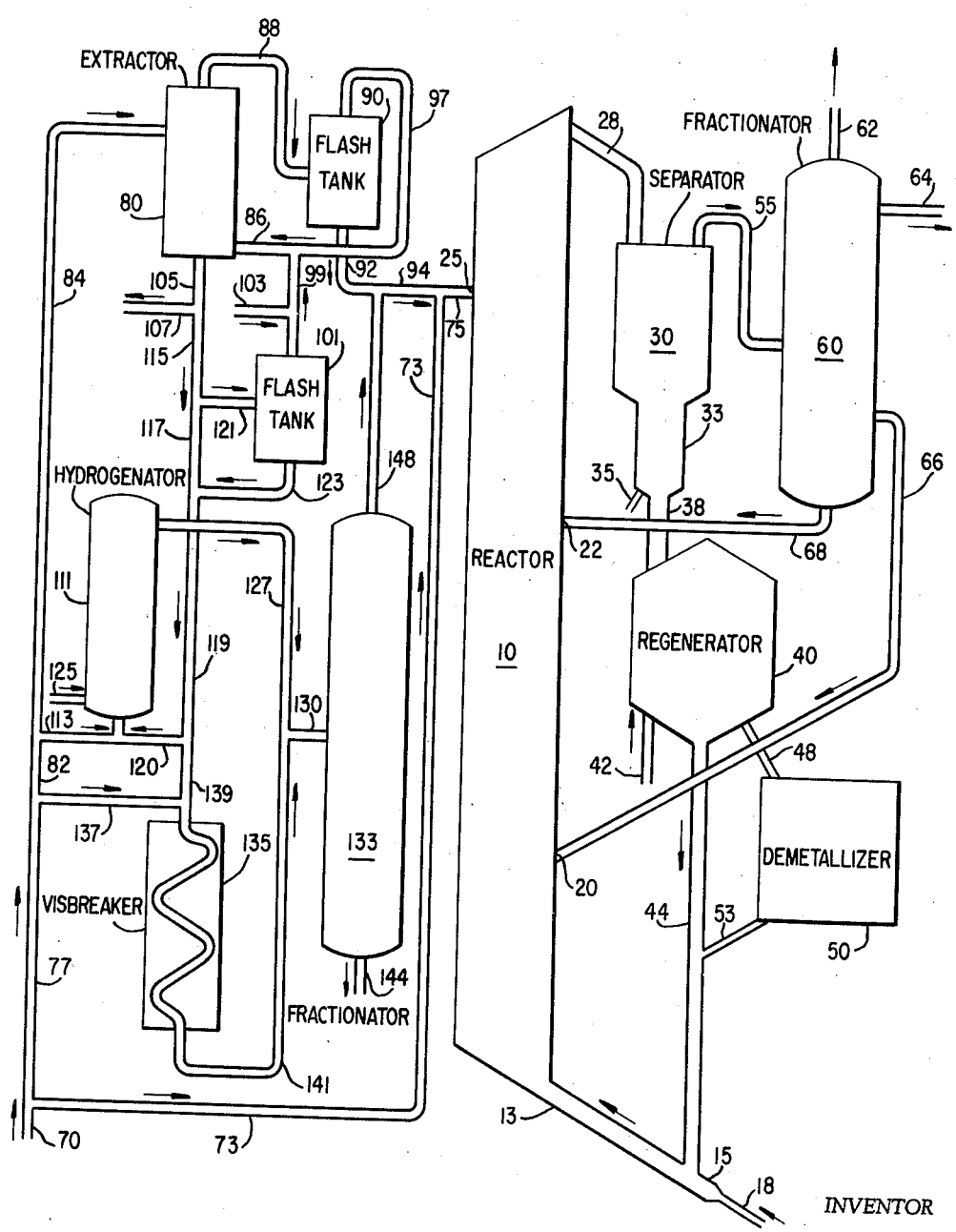
INVENTOR
BERNARD S. FRIEDMAN
BY Adams, Forward & McLean
ATTORNEYS

United States Patent Office 3,182,011
Patented May 4, 1965

3,182,011
CRACKING A PLURALITY OF
HYDROCARBON STOCKS
Bernard S. Friedman, Chicago, Ill., assignor, by mesne assignments, to Sinclair Research, Inc., New York, N.Y., a corporation of Delaware
Filed June 5, 1961, Ser. No. 114,994
14 Claims. (Cl. 208—78)

This invention is a method for catalytic conversion of mineral hydrocarbon oils containing metal contaminants whereby the contaminating effects of the metals on the catalyst are substantially avoided. This invention provides a method wherein a contaminated feedstock and a relatively contaminant-free feedstock are subjected to conversion conditions in the presence of a flowing catalyst stream. The catalyst stream contacts first the relatively contaminant-free feedstock, thereby avoiding substantial depositing of contaminants on the catalyst during the initial portion of catalyst travel in the conversion reactor. Later in time, preferably just prior to catalyst removal from the reaction zone, the catalyst stream contacts the more heavily contaminated feedstock. In this latter portion of catalyst travel through the reactor a greater deposition of contaminants on the catalyst occurs. This invention provides for removal of contaminants from the catalyst: the coke being removed by regeneration and the metals being removed by catalyst demetallization techniques hereinafter described to provide, for return to the reactor, a catalyst diminished in coke content and having less metal poisons.

In copending applications Serial Nos. 69,243 and 69,244, filed November 10, 1960; Serial No. 88,150, filed February 9, 1961 and Serial No. 101,955 filed April 10, 1961, for example, methods are described by which metal contaminated petroleum hydrocarbon feedstocks may be catalytically cracked, usually in the presence of other substantially uncontaminated feedstocks, with the poisoning effects of the metals on the catalyst being overcome by demetallization of the catalyst. The method of this invention provides for even greater efficiency in such cracking procedures by performing the cracking of substantially uncontaminated feedstocks with catalyst having a lower metals level before the contact of catalyst with the contaminated feedstocks raises the metals poison level of the catalyst.

The catalytic cracking of various heavier mineral hydrocarbons, for instance petroleum distillates such as straight run gas oils; shale oils, etc., has been proposed for many years and the catalytic cracking of gas oils is practiced to a considerable extent on a commercial scale. The behavior of a hydrocarbon feedstock in the cracking reactions depends upon various factors including its boiling point, carbon-forming tendencies, content of catalyst contaminating metals, etc., and these characteristics may affect the operation to a extent making a given feed-stock uneconomical to employ. For example contaminated feedstock raises the metals poison level of the catalyst. Large quantities of mineral oil petroleum crudes, fractions thereof, and hydrocarbons derived therefrom, contain harmful amounts of metal impurities, such as nickel, vanadium and iron. The need has been expressed in the art for a feasible process for the catalytic cracking of petroleum residua or similar heavy mineral hydrocarbon feeds. The chief deterrent to catalytic cracking of residua by conventional means has been the severe catalyst contamination, due to coke-formers and contaminant metals in most residua, which deposit on the catalyst leading to poor catalyst activity and poor product distribution such as increasing coke and gas make and decreasing gasoline make. Thus catalytic cracking of the hydrocarbons is uneconomical because the metal impurities harmfully affect selectivity of the catalyst. For this reason, such stocks have not heretofore been utilized to the fullest possible extent. In addition to metals naturally present, including some iron, petroleum stocks have a tendency to pick up tramp iron from transportation, storage and processing equipment. Most of the contaminating metals, when present in a hydrocarbon stock, deposit in a relatively non-volatile form on the catalyst during the conversion processes so that regeneration of the catalyst to remove coke does not remove these contaminants. Feedstock quality becomes more important as the cost of the catalyst rises and thus the effects of low feedstock quality are particularly burdensome in systems employing cracking catalysts containing the relatively expensive synthetic components. In such situations frequent discarding of the catalyst to prevent the accumulation of poisoning metals in the cracking catalyst represents a substantial cost factor.

Catalytic cracking is ordinarily effected to produce gasoline as the most valuable product and is generally conducted at temperatures of about 750 to 1050° F., preferably about 850 to 975° F., at pressures up to about 100 p.s.i.g., preferably about atmospheric to 5–15 p.s.i.g., and advantageously without substantial addition of free hydrogen to the system. In cracking operations, batch, semi-continuous or continuous systems are used but most often the latter. In a typical operation the catalytic cracking of a hydrocarbon feed would normally result in the conversion of about 40 to 70%, preferably about 50 to 60%, of the feedstock into a product boiling in the gasoline range.

The cracking catalyst is of the solid refractory metal oxide type known in the art, for instance silica, alumina, magnesia, titania, etc., or their mixtures. Of most importance are the synthetic gel-containing catalysts, such as the synthetic and the semi-synthetic, i.e. synthetic gel supported on a carrier such as natural clay, cracking catalysts. The cracking catalysts which have received the widest acceptance today are usually predominantly silica, that is silica-based, and may contain solid acidic oxide promoters, e.g. alumina, magnesia, etc., with the promoters usually being less than about 35% of the catalyst, preferably about 5 to 25%. These compositions are calcined to a state of very slight hydration. The cracking catalyst can be of macrosize, for instance bead form or finely divided form, and employed as a fixed, moving or fluidized bed as noted with respect to the hydrotreating catalyst. In this invention finely divided catalyst, for instance having particles predominantly in the 20 to 150 micron range, flows concurrently at high velocity through an elongated reactor with the vaporized hydrocarbons to be converted.

In the above-mentioned copending applications heavy hydrocarbon feedstocks, generally derived from mineral oil residual fractions and containing metal contaminants are blended with a relatively metals-free fresh feed, usually derived from a mineral oil distillate, before contact with the catalyst. Substantially metals-free recycle materials from the cracking reaction may also be included in the cracking feed. A disadvantage in charging such a mixed feed is that the metal poisons contained in such a mixed feed although diluted promptly deposit on the catalyst, raising the poisoning metals level and making the cracking of the fresh unpoisoned feed inferior to that which can be obtained with a slightly less poisoned catalyst, e.g. the catalyst poisoned to a little less than the equilibrium metals level.

In this invention finely divided catalyst in vaporized oil suspension is passed through an elongated confined reaction flow path utilizing only vapors of mineral or petroleum hydrocarbon charge stocks containing relatively low proportions of contaminating constituents, such as virgin or straight run gas oil, and feedstocks containing larger amounts of contaminants, such as metals, are introduced further along the reaction path to crack the contaminated stock and deposit metal poisons and other contaminants on the catalyst. At the end of the flow path, hydrocarbons are separated from the catalyst, which is regenerated. A portion of metal contaminated catalyst is removed intermittently or continuously from the conversion system and demetallized. The demetallized catalyst is returned to the cracking zone entrained in vapors of fresh virgin relatively metals-free gas oil.

Besides delaying contamination of the catalyst with metals by conducting the cracking under flow conditions of progressive reaction; that is, by contacting the catalyst under cracking conditions first with the relatively contaminant-free charge stock in vapor form while flowing the catalyst and vapor through an elongated confined reaction flow path, and introducing the metals-contaminated charge stock into the flow path at a point later in time than the point of catalyst introduction, this invention delays other catalyst contamination effects. The above-mentioned metals-contaminated feeds, such as residuals or gas oils derived from residuals, by deasphalting, etc., usually, due to the stocks from which they were derived, contain coke-forming constituents. Labile molecules in deasphalted gas oil tend to coke the catalyst and to prevent the desired cracking of paraffins and naphthenes present in the fresh gas oil. The progressive flow cracking employed in this invention helps prevent such coking until after the fresh uncontaminated feed has had the chance to react.

The vaporous hydrocarbon effluent from the cracking, after separation from the catalyst, conveniently is distilled to isolate the gasoline fraction. Also, products, such as fixed gases, boiling below the gasoline range are removed from the system. A cycle oil fraction or two also usually is isolated and returned to the cracking reactor, but not usually in admixture with fresh feed as in conventional practice; refractory bicyclic aromatics usually contained in the cycle stock are preferentially adsorbed on the catalyst, reducing the ability of the catalyst to crack paraffins and naphthenes. These fused ring aromatics cannot undergo cleavage to gasoline but instead tend to form still larger molecules which further condense to form coke on the catalyst. In this invention such cycle oils may be introduced to the flowing catalyst stream at a point between catalyst introduction with virgin uncontaminated feed and the point of metals-containing feed introduction. It is an object of the present invention to treat residual or other petroleum fractions such as asphaltic gas oils or reduced asphaltic crudes containing metal contaminants in company with more conventional feedstocks by a combined process in which the steps of catalytic cracking and catalyst demetallization are employed and adjusted to minimize the yield of low value products and to maximize the yields of high quality products such as high octane gasoline and other valuable constituents.

One or both of the mineral oil feedstocks to the process of the present invention is a "gas oil." A gas oil is one which boils essentially between two temperatures that establish a range falling within from about 400° F. to about 1100–1200° F. A gas oil could boil over the entire range 400–1200° F. or it could boil over a narrower range, e.g. 500–900° F. The gas oil introduced first into the cracking reactor in this invention, which is variously referred to herein as "virgin gas oil" or "uncontaminated gas oil" is usually a mineral oil or petroleum hydrocarbon fraction such as straight run gas oil or other normally liquid hydrocarbon which contains less than about 0.5 part per million of vanadium or less than about 0.2 part per million of nickel. Such feedstocks are the type generally supplied for catalytic cracking. The relatively highly contaminated feedstock, which contacts the catalyst stream last, may be a heavier, e.g. vacuum, gas oil fraction of the crude oil or may be a treated or untreated metals-contaminated residual stock. Such contaminated feeds will usually contain more than about 1.5 parts per million of vanadium and/or 0.6 part per million of nickel. Preferably this last-added feedstock will contain more than 4–10 p.p.m. nickel and/or 5–20 p.p.m. vanadium. The amounts of contaminated and uncontaminated feeds are adjusted so that the amount of metals in the entire feed contacted by the catalyst in its passage through the reactor will contain more than about 0.2 p.p.m. nickel and/or 0.5 p.p.m. vanadium in order to justify the provisions made in this invention for cracking catalyst demetallization and preferably the total feed to cracking will contain more than about 1 p.p.m. nickel and about 2 p.p.m. vanadium but less than about 10 p.p.m. nickel and/or 20 p.p.m. vanadium.

A residual stock is a crude oil fraction higher boiling than gas oil, and it is undistilled. Any fraction, regardless of its initial boiling point, which includes heavy bottoms, such as tars, asphalts, etc., may be termed a residual fraction. Accordingly, a residual stock can be the portion of the crude boiling above about 1100–1200° F., or it can be made up of a gas oil fraction plus the portion boiling above about 1100–1200° F. For instance, a topped crude may be the entire portion of the crude remaining after the light ends (the portion boiling up to about 400° F.) have been removed by distillation. Therefore, such a fraction includes the entire gas oil fraction (400° F. to 1100–1200° F.) and the normally undistilled portion of the crude petroleum boiling above about 1100–1200° F. Residuals are usually highly contaminated with metals and the art has adopted a number of techniques for producing or recovering substantially metals-free gas oil fractions from such mineral oil stocks for use in catalytic cracking. However, the extent of pretreatment required to get a substantially metals-free gas-oil from such a contaminated residual is frequently so extensive that the cost of the pretreatment is higher than the value of the gas oil produced. In this invention, however, the residuals or the gas oils produced from pretreatment of residuals need not be substantially metals-free, but may contain the amounts of metal contaminants noted above.

One technique for producing a low-metals gas oil from a residual is a selective solvent treatment for the residual to remove gas oil, while leaving behind a heavy fraction containing most of the metal contaminants which are normally present. The solvent extraction process (deasphalting) comprises contacting a residual petroleum fraction containing a major portion of components boiling above above 900° F. with liquefied normally gaseous hydrocarbons under conditions to form a gas oil extract phase, and an asphalt raffinate phase, containing most of the metal contaminants of the feedstock. This raffinate phase is generally not employed in gasoline production because of its high metal content but rather is diverted to low-value uses, such as low-grade fuel or road surfacing materials. The extract hydrocarbon phase desired for catalytic cracking may frequently contain contaminant metals in amounts high enough to poison the catalyst, especially where "deeper cutting" is employed for more complete removal of gas oil components from the raffinate phase.

Gas oils for cracking may also sometimes be prepared from residuals by a mild thermal cracking or visbreaking treatment. The visbreaker effluent is generally fractionated to produce a gas oil fraction and a bottoms fraction. While, once more, the major portion of metal contaminants will tend to gather in the heavier fraction, the gas oils may sometimes contain catalyst-poisoning amounts of metals. Hydrogenation is sometimes employed for the conversion of heavier components to gas oils suitable for cracking. Hydrogenation improves the hydrogen-tocarbon ratio of the feedstock. Some cracking may also occur in this step as well as reduction in metals content of the feed.

Contaminated gas oils resulting from such treatments of residuals may be employed in the instant invention, which will be better understood by reference to the accompanying drawing which is a schematic representation of apparatus which may be used in the process.

The apparatus comprises a reactor 10 which preferably is an elongated tubular vessel which is provided at its bottom with an entry 13 for catalyst which is conveyed through tube 15 by virgin "unpoisoned" gas oil from the source 18. Above the catalyst entry the reactor 10 is provided with an entry 20 for light recycle gas oil. Above this, an entry 22 is provided for heavy recycle gas oil and still further above this an entry 25 is provided for the introduction of the hydrocarbon containing significant metal and other contaminants. As explained above, catalyst and oil flow concurrently at high velocity under cracking conditions upwardly through the reactor 10. The mixture of catalyst, cracked products and unreacted feed leave the reactor 10 by exit line 28 to the separator 30, where catalyst containing a greater amount of poisoning metals than it had when it entered the reactor 10 is disentrained from hydrocarbon vapors. The separator 30 may be provided with lower throat section 33 which has steam entry line 35 to provide steam stripping of hydrocarbons from the pores of the catalyst. Catalyst flows by tube 38 to the regenerator 40 for contact with air or other free-oxygen containing gas from the line 42 to burn carbon from the catalyst, preferably under fluidizing conditions. Regenerated catalyst leaves the regenerator by standpipe 44 for conduction back to the reactor by way of line 15. The regenerator is also provided with the line 48 for removal of a slip-stream of catalyst to the demetallizer 50. This item in the drawing represents a series of treatment vessel in which demetallization procedures, to be described below, are performed. Catalyst returns to the cracking system by way of line 53.

Hydrocarbon vapor, free of contaminating metals, leaves the separator 30 by way of line 55 to the fractionator 60. This fractionator may in reality be a series of distillation and/or condensation vessels which are provided with the exit lines 62 for fixed gases and 64 for gasoline components, both of which are removed from the system, 66 for light recycle gas oils, for example, those boiling in the range of about 400–900° F., and 68 for heavy recycle gas oils, boiling over about 900° F. As shown, line 66 leads to entry 20 in the reactor 10 and line 68 leads to entry 22 in the reactor.

Metals contaminated virgin oils are brought to the reactor 10 at the entry 25 directly or indirectly from the source 70. Where the contaminated oil is generally suitable in its cracking characteristics for immediate feed to the cracker, it is brought directly from source 70 to entry 25 by lines 73 and 75. Some residual fractions and most vacuum gas oils are suitable for such direct feeding. Where a preliminary treatment of the contaminated feed is required it is conducted by line 77 to the required treatment.

For example, where the source 70 provides an asphaltic residuum, it may prove advisable to perform solvent deasphalting on the feed. The feed is therefore conducted to extraction vessel 80 from line 77 by means of lines 82 and 84. In the vessel 80, the asphaltic residuum is contacted preferably countercurrently with a solvent from the line 86. The solvent removes gas oil constituents from the residuum, forming an extract phase which leaves the extractor 80 by way of line 88 to the flash tank 90. In the flash tank 90 solvent is removed from the gas oil which travels by lines 92, 94 and 75 to the entry 25 of the reactor 10. Solvent is recycled by line 97 to the line 86, where it may be mixed with other solvent from the line 99 from the flash tank 101 and/or from the external source 103. The raffinate phase from the extraction tower is removed by line 105 and may be drawn from the system by line 107.

When this asphaltic material is to be exploited for its cracking feed components, hydrogenation vessel 111 may be employed. Further, this vessel may be employed for treatment of residuals which do not require solvent deasphalting. These latter materials may be conducted directly to the hydrotreating from lines 70, 77 and 82 by line 113. Asphaltic components from the extractor may be conducted to the hydrotreating stage from line 105 by way of lines 115, 117, 119 and 120. Alternatively, line 115 may lead to line 121 and flash tank 101 where any solvent drawn off with the raffinate phase may be removed for recycle to the extraction step, leaving metals-contaminated asphaltic components for conduction to the hydrotreater by way of lines 123, 119 and 120. The hydrotreater 111 is provided with the line 125 for admission of hydrogen during the reaction or regenerating gas during catalyst regeneration. The hydrotreater effluent which has been somewhat reduced in metals content, travels by lines 127 and 130 to the fractionator 133.

Alternative to a hydrotreating performed on the asphaltic raffinate or untreated residual hydrocarbon, visbreaker 135 may be employed for treatment preliminary to cracking. Fresh residual feed may pass to the visbreaker by line 137 and asphaltic material by line 139. After being thermally cracked, metals-contaminated hydrocarbon passes by lines 141 and 130 to the fractionator 133 which separates out a bottoms fraction for removal from the system by line 144, from the gas oil components which travel by lines 148, 94 and 75 to the entry 25 of the reactor 10.

It will be understood that the apparatus employed will be provided with the necessary valves, heaters and inlets and outlets for auxiliary gases and liquids needed for the performance of the process.

As mentioned above, by subjecting a plurality of petroleum hydrocarbon charge stocks to conversion conditions in the presence of a finely divided solid catalyst under flow conditions providing progressive reaction, the cracking process of this invention provides preferential cracking of the petroleum hydrocarbon charge stocks since the feedstocks containing relatively high proportions of contaminants are contacted with the catalyst only after the catalyst has had an opportunity to react with the relatively uncontaminated virgin feed in the first portion of the reaction path. In addition, the method of separate feed injection of this invention permits other types of operation in a more effective manner. For example, it provides a method of maintaining required high reaction temperature throughout the length of the reaction path by more even spacing of the mildly exothermic cracking throughout the reactor. For example, by providing for introduction of a recycle oil at or near the half-way point of the reaction path and a metals-containing gas oil at or near the last one-fourth or one-eighth of the reaction path, the temperature may be so graduated throughout the reaction zone that the temperature at the point of entry of the metals-contaminated gas oil may be that required to permit a clean-up of coke forming and poisoning constituents by means of selective cracking and full deposition of metals. The demetallized gas oil could then be separated from the reaction effluent as recycle stock and returned to the system for further conversion. In another modification, a gasoline may be treated or retreated in the system by contact with the freshly regenerated catalyst and a virgin gas oil may be initially cracked by introduction to the system at a point further along the reaction path.

The portion of the petroleum hydrocarbon charge stock to be converted containing relatively low proportions of contaminants is vaporized and mixed with finely divided freshly regenerated catalyst at or near a point where it enters the reaction path to form a suspension having a density of about 5 to 10 pounds per cubic foot and the suspension is flowed at a linear velocity exceeding about 12 to 15 feet per second upwardly through an elongated vertically extending reaction path. The other petroleum hydrocarbon charge stocks containing relatively high proportions of non-metal contaminants are charged to the reaction flow path at several points further along the confined reaction flow path. The conditions of cracking have in general already been described. A catalyst-to-oil ratio of about 10/1 to 25/1 and a weight hourly space velocity in the range of about 5 to 60 are preferred.

Solvent deasphalting may be chosen as the preliminary treatment when mineral oil residua, such as vacuum residua, atmospheric residua, tars, pitches, etc., boiling primarily above about 600° F. or even above about 900° F. are available. The residual feed often has an A.P.I. gravity in the range of about 0° to 25°, a Conradson carbon content in the range of about 3 to 35 weight percent and a viscosity often above about 200 seconds Saybolt Furol at 210° F. The residual feedstock may contain as little as about 5 or 15 p.p.m. nickel, and/or about 10 or 25 p.p.m. vanadium. The residual feedstock will usually include at least about 5 or 10 parts per million of one or more of nickel and vanadium. The maximum amount of metals in the residuals can vary widely; preferably the maximum amount of these poisoning metals in the residual stock will not exceed about 50 p.p.m. nickel, about 100 p.p.m. vanadium. Feeds containing as much as about 250 p.p.m. nickel, and 500 or 1000 p.p.m. vanadium or more may be processed by this invention but economic factors may be adversely affected at these high levels.

The solvent is generally a liquefied, normally gaseous hydrocarbon, for example, a liquefied, normally gaseous hydrocarbon mixture of propane containing 5–90% butane, and preferably about 10–50% butane. After contacting, the mixture of residual and solvent separates into two phases, an extract phase containing solvent and gas oil components and a raffinate or asphalt phase. After removal of the solvent, the deasphalted gas oil, containing less contaminants than the residual feed, but still more highly metals contaminated than conventional cracking feeds, is sent to the cracking at the latter portion of the catalyst flow path in the cracker. The solvent-to-oil ratio is adjusted to provide an extract containing at least about 0. p.p.m. nickel and/or 1.5 p.p.m. vanadium in order to justify the provisions made for cracking catalyst demetallization.

The deoiled asphalt raffinate phase may also be used to provide further gas oid components for the cracker feedstock. Such gas oil components may be supplied by converting components of the deoiled asphalt into materials suitable for use as part of the cracker feed, for example by reducing the carbon chain length of some asphalt fraction components as by visbreaking and/or by increasing the hydrogen-to-carbon ratio of some of these components, for instance, by hydrotreating. These operations are performed preferably after removal of solvent entrained in the reaffinate by any convenient means such as by volatilizing the traces of solvent, washing them out with water or disentraining solvent by the use of steam.

In a visbreaker, relatively high temperatures in the range of about 800–950° F. at the visbreaker outlet and short contact times may be employed. Alternatively, the deoiled asphalt product from the extraction step may be hydrogenated to improve the hydrogen-to-carbon ratio and give a partial reduction in metals content of the cracking feed. Some hydrocracking may also occur in this treatment. The hydrogenolysis step may be carried out over a catalyst, preferably a sulfide or oxide of molybdenum or tungsten, which is resistant to poisoning by sulfur. The conditions of hydrotreating may be adjusted to give the desired amount of metals removal. This amount, in turn, is determined by a number of factors: the amount of poison remaining in the hydrotreated product, the proportion of hydrotreated product sent to the catalytic cracking, the amount of unpoisoned hydrocarbon material cracked along with the hydrotreater effluent, etc. Hydrotreating may remove only about 10% of the poisoning metal in the hydrotreater feed, but preferably the reduction of one or all of nickel, vanadium and iron will be about 65 to 90 weight percent. The effluent from the hydrogenolysis or visbreaking unit is separated by fractionation into a gas oil fraction which may be combined with the gas oil from the solvent extraction and passed to the cracker. The residue of the hydrogenolysis or visbreaking may be removed from the system, or as an alternative, may be passed back to the deasphalting unit or recycled to the visbreaking and/or hydrogenolysis unit.

The recovered gas oil is subjected to the last phase of catalytic cracking. Contaminating metals in greater quantities than are acceptable to the art generally are present in the total cracker feedstock. The total cracking feedstock boils above the gasoline range, preferably in the range of about 600–1100° F. and contains a significant amount of the partially demetallized feedstock. The amount of metals-contaminated feedstock in the total cracking feed will be at least about 5–10%, preferably about 20–70%. The feed may comprise gas oil fractions from the extract phase of the solvent treatment or from the visbroken or hydrotreated raffinate or both, or, as mentioned above may be any highly metal contaminated hydrocarbon feedstock which has or has not received a significant preliminary treatment.

As described above, after passage through the reactor the catalyst-hydrocarbon mixture is separated and the vaporous products are taken overhead. The catalyst is passed to a regeneration zone where coke or carbon is burned from the catalyst in a fluidized bed by contact with a free oxygen-containing gas before its return to the reaction zone. Regeneration of a catalyst to remove carbon is a relatively quick procedure, as in most commercial catalytic conversion operations. The catalyst is contacted with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%. Regeneration puts the catalyst in a substantially carbon-free state, that is, the state where little, if any, carbon is burned or oxygen consumed even when the catalyst is contacted with oxygen at temperatures conducive to combustion.

A slip-stream of catalyst, at the "equilibrium" level of poisoning metals may be removed intermittently or continuously from the regenerator of the cracking system. The catalyst is subjected to one or more of the demetallization procedures described hereinafter and then the catalyst, substantially reduced in contaminating metal content, is returned to the cracking system to give an average metal content for the entire amount of catalyst returning to the cracking reactor just a little less than the "equilibrium" level found in the regenerator. In this invention the uncontaminated cracking stocks contact the catalyst having a little less than the equilibrium amount of metals. Then, in the final phase of the catalyst path through the reactor the catalyst poisoning metal content is brought up once more to the equilibrium level when it contacts the contaminated feedstock and further metals deposition occurs.

In the treatment to take poisoning metals from the cracking catalyst the amount of metal is removed which is necessary to keep the average metal content of the catalyst in the cracking system below the limit of the unit's tolerance for poison. The tolerance of the cracker for poison in turn determines to a large extent the amount of metals removed in the catalyst demetallization procedure. Where the catalyst contains a greater amount of poisoning metal, a particular treatment will remove a greater amount of metal; for example, if the cracker can tolerate an average of 100 p.p.m. Ni and the demetallization process can remove 50% of the nickel content of the catalyst, only 50 p.p.m. of nickel can be removed in a pass through the catalyst demetallization system. However, where the cracker can tolerate 500 p.p.m. of nickel, it is possible to remove 250 p.p.m. nickel from the catalyst with each pass through the demetallization system. Ordinarily, it is advisable, therefore, to operate the cracking and demetallization procedures with a catalyst having a metals content near the limit of tolerance of the cracker for poisoning metals. This tolerance for poisoning metal oxide is seldom greater than about 5000–10,000 p.p.m. Catalyst demetallization is not economically justified unless the catalyst contains at least about 50 p.p.m. nickel and/or 50 p.p.m. vanadium. Preferably the equilibrium metals level is allowed to exceed about 200 p.p.m. nickel and/or 500 p.p.m. vanadium so that total metals removal will be greater per pass through the demetallizer.

In the treatment to take poisoning metals from the cracking catalyst a large or small amount of metal can be removed as desired. The demetallization treatment generally removes about 10 to 90% of one or more poisoning metals from a catalyst portion which passes through the treatment. Preferably a demetallization system is used which removes about 60 to 90% nickel and 20–40% vanadium from the treated portion of catalyst. Preferably at least 50% of the equilibrium nickel content and 15% of the equilibrium vanadium content is removed. The actual time or extent of treating depends on various factors, and is controlled by the operator according to the situation he faces, e.g. the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison. A satisfactory treating rate may be about 5 to 50% of the total catalyst inventory in the system, per twenty-four hour day of operation although other treating rates may be used.

The demetallization of the catalyst will generally include one or more processing steps. Copending patent applications Serial Nos. 758,681, filed September 3, 1958, now abandoned; 763,833, and 763,834, filed September 29, 1958, now abandoned; 767,794, filed October 17, 1958; 842,618, filed September 28, 1959, now abandoned; 849,119, filed October 28, 1959, now Patent No. 3,094,059; 19,313, filed April 1, 1960, now abandoned; 39,810, filed June 30, 1960; 47,598, filed August 4, 1960; 53,380, filed September 1, 1960, now Patent No. 3,122,497; 53,623, filed September 2, 1960; 54,368, now Patent No. 3,122,512; 54,405, now Patent No. 3,122,510, and 54,532, filed September 7, 1960, now abandoned; 55,129; 55,160 and 55,184, filed September 12, 1960; 55,703, filed September 13, 1960; 55,838, filed September 14, 1960, now abandoned; 73,199, filed December 2, 1960 and 81,256 and 81,257, filed January 9, 1961, now abandoned; all of which are hereby incorporated by reference, describe procedures by which vanadium and other poisoning metals included in a solid oxide hydrocarbon conversion catalyst are removed by dissolving them from the catalyst or subjecting the catalyst, outside the hydrocarbon conversion system, to elevated temperature conditions which put the metal contaminants into the chloride, sulfate or other volatile, water-dispersible or more available form. A significant advantage of these processes lies in the fact that the overall metals removal operation, even if repeated, does not unduly deleteriously affect the activity, selectivity, pore structure and other desirable characteristics of the catalyst.

Treatment of the regenerated catalyst with molecular oxygen-containing gas is employed to improve the removal of vanadium from the poisoned catalyst. This treatment is described in copending application Serial No. 19,313 and is preferably performed at a temperature at least about 50° F. higher than the regeneration temperature, that is, the average temperature at which the major portion of carbon is removed from the catalyst. The temperature of treatment with molecular oxygen-containing gas will generally be in the range of about 1000 to 1800° F. but below a temperature where the catalyst undergoes any substantial deleterious change in its physical or chemical characteristics, preferably a temperature of about 1150 to 1350° F. or even as high as 1600° F. The duration of the oxygen treatment and the amount of vanadium prepared by the treatment for subsequent removal is dependent upon the temperature and the characteristics of the equipment used. If any significant amount of carbon is present in the catalyst at the start of this high-temperature treatment, the essential oxygen contact is that continued after carbon removal, which may vary from the short time necessary to produce an observable effect in the later treatment, say, a quarter of an hour to a time just long enough not to damage the catalyst. In any event, after carbon removal, the oxygen treatment of the essentially carbon-free catalyst is at least long enough to stabilize a substantial amount of vanadium in its highest valence state, as evidenced by a significant increase, say at least about 10%, preferably at least about 100%, in the vanadium removal in subsequent stages of the process. This increase is over and above that which would have been obtained by the other metals removal steps without the oxygen treatment. The maximum practical time of treatment will vary from about 4 to 24 hours, depending on the type of equipment used. The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air, containing at least about 1%, preferably at least about 10% $O_2$. The partial pressure of oxygen in the treating gas may range widely, for example, from about 0.1 to 30 atmospheres, but usually the total gas pressure will not exceed about 25 atmospheres.

The catalyst may pass directly from the oxygen treatment to a vanadium removal treatment especially where this is the only important contaminant, as may be the case when a feed is derived, for example, from Venezuelan crude. Such treatment may be a basic aqueous wash such as described in copending patent applications Serial No. 767,794 and Serial No. 39,810. Alternatively, vanadium may be removed by a chlorination procedure as described in copending application Serial No. 849,199.

Vanadium may be removed from the catalyst after the high temperature treatment with molecular oxygen-containing gas by washing it with a basic aqueous solution. The pH is frequently greater than about 7.5 and preferably the solution contains ammonium ions which may be $NH_4+$ ions or organic-substituted $NH_4+$ ions such as methyl ammonium and quaternary hydrocarbon radical ammoniums. The amount of ammonium ion in the solution is sufficient to give the desired vanadium removal and will often be in the range of about 1 to 25 or more pounds per ton of catalyst treated. The temperature of the wash solution may vary within wide limits: room temperature or below, or higher. Temperatures above 215° F. require pressurized equipment, the cost of which does not appear to be justified. Very short contact times, for example, about a minute, are satisfactory, while the time of washing may last 2 to 5 hours or longer. After the ammonium wash the catalyst slurry can be filtered to give a cake which may be reslurried with water or rinsed in other ways, such as, for example, by a water wash on the filter, and the rinsing may be repeated, if desired, several times.

Alternatively, after the high temperature treatment with oxygen-containing gas, treatment of a metals contaminated catalyst with a chlorinating agent at a moderately elevated temperature up to about 1000° F. is of value in removing vanadium from the catalyst as volatile chlorides. This treatment is described in copending application Serial No. 849,199. The chlorination takes place at a temperature of at least about 300° F., preferably about 550 to 650° F. with optimum results usually being obtained near 600° F. The chlorinating agent is essentially anhydrous, that is, if changed to the liquid state no separate aqueous phase would be observed in the reagent.

The chlorinating reagent is an anhydrous vapor which contains chlorine or sometimes HCl, preferably in combination with carbon or sulfur. Such reagents include molecular chlorine but preferably are mixtures of chlorine with, for example, a chlorine substituted light hydrocarbon, such as carbon tetrachloride, which may be used as such or formed in-situ by the use of, for example, a vaporous mixture of chlorine gas with low molecular weight hydrocarbons such as methane, n-pentane, etc. About 1 to 40% active chlorinating agent based on the weight of the catalyst is generally used. The carbon or sulfur compound promoter is generally used in the amount of about 1 to 5 or 10% or more, preferably about 2 to 3%, based on the weight of the catalyst for good metals removal; however, even if less than this amount is used, a considerable improvement in metals conversion is obtained over that which is possible at the same temperature using chlorine alone. The chlorine and promoter may be supplied individually or as a mixture to a poisoned catalyst. Such a mixture may contain about 0.1 to 50 parts chlorine per part of promoter, preferably about 1 to 10 parts per part of promoter. A chlorinating gas comprising about 1 to 30 weight percent chlorine, based on the catalyst, together with 1% or more $S_2Cl_2$ gives good results. Preferably, such a gas provides 1 to 10% $Cl_2$ and about 1.5% $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$; 5 to 10 parts $Cl_2$ or HCl. Conveniently, a pressure of about 0 to 100 or more p.s.i.g., preferably about 0 to 15 p.s.i.g., may be maintained in chlorination. The chlorination may take about 5 to 120 minutes, more usually about 20 to 60 minutes, but shorter or longer reaction periods may be possible or needed, for instance, depending on the linear velocity of the chlorinating and purging vapors.

The demetallization procedure employed in this invention may be directed toward nickel removal from the catalyst, generally in conjunction with vanadium removal. Nickel removal may be accomplished by dissolving nickel compounds directly from the catalyst and/or by converting the nickel compounds to volatile materials and/or materials soluble or dispersible in an aqueous medium, e.g. water or dilute acid. The water-dispersible form may be one which decomposes in water to produce water-soluble products. The removal procedure for the converted metal may be based on the form to which the metal is converted. The mechanism of the washing steps may be one of simultaneous conversion of nickel and/or vanadium to salt form and removal by the aqueous wash; however, this invention is not to be limited by such a theory.

Conversion of some of the metal poisons especially nickel, to water-dispersible form is described in copending application Serial No. 758,681, by subjecting the catalyst to a sulfating gas, that is $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure, described in copending applications Serial No. 763,834 and Serial No. 842,618, includes sulfiding the catalyst and performing an oxidation process, after which metal contaminants in water-dispersible form, preferably prior to an ammonium wash, may be removed from the catalyst by an aqueous medium.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix. The sulfiding step performs the function not only of supplying a sulfur-containing metal compound which may be easily converted to a water-dispersible form but also appears to concentrate some metal poisons, especially nickel, at the surface of the catalyst particle.

Oxidation after sulfiding may be performed by a gaseous oxidizing agent to provide metal poisons in a dispersible form. Gaseous oxygen, or mixtures of gaseous oxygen with inert gases such as nitrogen, may be brought into contact with the sulfided catalyst at an oxygen partial pressure of about 0.2 atmosphere and upward, temperatures upward of room temperature and usually not above about 1300° F., and times dependent on temperature and oxygen partial pressure. Gaseous oxidation is best carried out near 900° F., about one atmosphere $O_2$ and at very brief contact times.

The metal sulfide may be rendered water-dispersible by a liquid aqueous oxidizing agent such as a dilute hydrogen peroxide or hypochlorous acid water solution, as described in copending application Serial No. 842,618. The inclusion in the liquid aqueous oxidizing solution of sulfuric acid or nitric acid has been found greatly to reduce the consumption of peroxide. In addition the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst. A 30% $H_2O_2$ solution in water seems to be an advantageous raw material for preparing the aqueous oxidizing solution. Sodium peroxide or potassium peroxide may be used in place of hydrogen peroxide and in such circumstances, extra sulfuric or nitric acid may be used.

Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. Varying oxygen partial pressure in the range of about 0.2 to 1.0 atmosphere appears to have no effect in time required for oxidation, which is generally at least about 7 to 8 minutes. The oxidizing slurry may contain about 20% solids and provide about 5 pounds of nitric acid per ton of catalyst. Studies have shown a greater concentration of $HNO_3$ to be of no significant advantage. Other oxidizing agents, such as chromic acid where a small residual $Cr_2O_3$ content in the catalyst is not significant, and similar aqueous oxidizing solutions such as water solutions of manganates and permanganates, chlorites, chlorates and perchlorates, bromites, bromates and prebromates, iodites, iodates and periodates, are also useful. Bromine or iodine water, or aerated, ozonated or oxygenated water, with or without acid, also will provide a dispersible form. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

After conversion of nickel sulfide to a dispersible form, the catalyst is washed with an aqueous medium to remove the metal poisons. This aqueous medium for best removal of nickel is generally somewhat acidic, and this condition may be brought about, at least initially, by the presence of an acid-acting salt or some entrained acidic oxidizing agent on the catalyst. The aqueous medium can contain extraneous ingredients in trace amounts, so long as the medium is essentially water and the extraneous ingredients do not interfere with demetallization or adversely affect the properties of the catalyst. Ambient temperatures can be used in the wash but temperatures of about 150° F. to the boiling point of water are sometimes helpful. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from a chlorinated catalyst, contact time in this stage is preferably held to about 3 to 5 minutes which is sufficient for nickel removal. Also, since a slightly acidic solution is desirable for nickel removal, this wash preferably takes place before the ammonium wash.

Alternative to the removal of poisoning metals by procedures involving contact of the sulfided or sulfated catalyst with aqueous media, nickel poison may be removed through conversion of the nickel sulfide to the volatile nickel carbonyl by treatment with carbon monoxide, as described in copending application Serial No. 47,598. In such a procedure the catalyst is treated with hydrogen at an elevated temperature during which nickel contaminant is reduced to the elemental state, then treated, preferably under elevated pressure and at a lower temperature with carbon monoxide, during which nickel carbonyl is formed and flushed off the catalyst surface. Hydrogenation takes place at a temperature of about 800 to 1600° F., at a pressure from atmospheric or less up to about 1000 p.s.i.g with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state. Carbonylation takes place at a temperature substantially lower than the hydrogenation, from about ambient temperature to 300° F. maximum and at a pressure up to about 2000 p.s.i.g., with a gas containing about 50 to 100 mole percent CO. Preferred conditions include greater than about 90 mole percent CO, a pressure of up to about 800 p.s.i.g. and a temperature of about 100 to 180° F. The CO treatment serves generally both to convert the elemental metals, especially nickel to volatile carbonyls and to remove the carbonyls.

After the ammonium wash, or after the final treatment which may be used in the catalyst demetallization procedure, the catalyst is conducted back to the cracking system. Where a small amount of the catalyst inventory is demetallized, the catalyst may be returned to the cracking system, preferably to the regenerator standpipe, as a slurry in its final aqueous treating medium. Where a large amount of catalyst inventory is treated, it may be desirable first to dry a wet catalyst filter cake or filter cake slurry at say about 250 to 450° F. and also, prior to reusing the catalyst in the cracking operation it can be calcined, say at temperatures usually in the range of about 700 to 1300° F. Prolonged calcination of the catalyst at above about 1100° F. may sometimes be disadvantageous. Calcination removes free water, if any is present, and perhaps some but not all of the combined water, and leaves the catalyst in an active state without undue sintering of its surface. Inert gases such as nitrogen frequently may be employed after contact with reactive vapors to remove any of these vapors entrained in the catalyst or to purge the catalyst of reaction products.

A fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time may have relatively little effect on the catalytic activity of the depositioned catalyst, although further metals content may be removed by repeated or other treatments.

The present invention will be further described with reference to the following examples which are not to be considered limiting.

*Example*

A residual feedstock comprised the asphalt fraction of a mixed Mid-Continent crude boiling over 400° F. and having a specific gravity (60/60° F.) of 0.995, a specific gravity (77/77° F.) of 0.988, a penetration at 77° F. of 234, a Conradson carbon residue of 19.72 weight percent, a viscosity (Furol) at 210° F. of 600.5 and at 275° F. of 90.4 and a ring and ball softening point of 100° F. The fraction had an average molecular weight of 1146 to 1160 and had 10.81–10.86 weight percent hydrogen, 13.98% pentane insolubles, 1.33% benzene insolubles, 1.00 weight percent sulfur, 76.8–77.5 p.p.m. NiO and 122–126 p.p.m. $V_2O_5$. This feedstock was sent to a solvent extraction tower and contacted countercurrently at a pressure of about 400 p.s.i.g. with 3.1 parts per part of feedstock of a solvent composition comprising about 38% butane and 62% propane. A temperature of 170° is maintained at the extract outlet at the top of the tower and 128° F. at the bottom. The yield was about 60% of a gas oil having an A.P.I. Gravity of 19.8 and containing 0.64% pentane insolubles. The average molecular weight was 970 and the metals content 6.1 p.p.m. NiO and 7.0 p.p.m. $V_2O_5$.

The Mid-Continent deoiled asphalt from the extraction tower is removed to a separator where the solvent is removed and recycled back to the solvent extraction tower. The deoiled asphalt has the following properties:

| | |
|---|---:|
| Specific Gravity at 60° F./60° F. | 1.0538 |
| Penetration at 77° F. | 4 |
| Carbon Residue (Conradson) | 31.0 |
| Viscosity, FV/350° F. | 196.6 |
| Ring & Ball Softening Point, ° F. | 196.6 |
| Pentane Insolubles, Wt. percent | 30.63–32.28 |
| Benzene Insolubles, Wt. percent | 3.72 |
| Sulfur, Wt. percent | 1.23 |
| Extraction Sediment, Wt. percent | 0.03 |

This raffinate product is conveyed from the separator to a hydrogenolysis unit along with recycle from the hydrogenolysis unit. Hydrogen in an amount of 2000 cubic feet per barrel of charge stock is also introduced. The space velocity of the charge stock to the hydrogenator is about 1.5 liquid volume of charge per volume of catalyst per hour. Hydrogenation of the charge stock takes place in contact with a molybdenum-trioxide-on-alumina-gel catalyst at a temperature of about 845° F. and a pressure of about 220 p.s.i. A gas oil hydrogenolysis product boiling between about 500 and 800° F., amounting to about 8 volume percent, based on the feed to the solvent extraction tower, and containing 14 p.p.m. nickel oxide and 23 p.p.m. vanadium pentoxide is separated in a fractionator and combined with the gas oil stock (6.1 p.p.m. NiO and 7.0 p.p.m. $V_2O_5$) resulting from the solvent extraction stop to give an overall metals level in the contaminated cracking feed of 6.8 p.p.m. NiO and 8.7 p.p.m. $V_2O_5$. About 13,450 barrels/day of this gas oil is sent to the cracking system of the invention.

The cracking reaction employs an elongated reactor about 40 feet high provided at its lower end with an inlet for oil and catalyst. The reactor also has inlets for oil at about 15, 25 and 35 feet from the bottom. About 28,000 barrels a day of substantially metals-free virgin gas oil having a gravity (A.P.I.) of about 25, a carbon residue of about 0.2, a sulfur content of about 0.5% and a boiling range of 400 to 850° F. along with about 18,000 pounds of steam per day heated to about 900° F. enters the bottom of the reactor conveying about 1100 tons per day of a synthetic silica-25% alumina gel catalyst having a fluidizable particle size. Catalyst and oil pass upwardly through the reactor at a velocity of about 15 feet per second. This upwardly flowing stream encounters, at the lowermost oil inlet about 3,600 barrels/day of light cycle oil from the fractionator and at the next inlet about 5,400 barrels/day of heavy recycle oil. The metals-containing gas oil is introduced at the topmost oil inlet. About 50% of the total feed is converted to materials boiling below about 400° F.

The catalyst-oil mixture passes out the top of the reactor to a separator where catalyst settles to the bottom. The hydrocarbon effluent is conveyed to a distillation tower for cooling and is separated into the heavy and light cycle oil fractions mentioned above. Gasoline and fixed gases are also recovered from the fractionator.

Catalyst settles to the lower throat portion of the separator, which holds about 50 tons of catalyst which is contacted with 31,200 pounds per hour of steam. The spent catalyst, containing about 1.3% carbon is continually sent to a regenerator, where it is contacted with air at 1050° F. to burn off the carbon. A side stream of the regenerated catalyst having a carbon content of about 0.4%, 160 p.p.m. nickel and 720 p.p.m. vanadium is continuously removed from the regenerator at a rate of about 20% of inventory daily and sent to an oxygen treating unit where it is held for about an hour in contact with air at about 1300° F. and then sent to a sulfiding zone where it is fluidized with $H_2S$ gas at a temperature of about 1150° F. for about 1½ hours. The catalyst is cooled and purged with inert gas and chlorinated with an equimolar mixture of $Cl_2$ and $CCl_4$ at about 600° F. After about 1 hour no trace of vanadium chloride can be found in the chlorination effluent and the catalyst is quickly washed with water. A pH of about 3 is imparted to this wash medium by chlorine entrained in the catalyst and the wash serves to remove nickel chloride.

The catalyst, substantially reduced in nickel and vanadium content, is filtered from the wash slurry, dried at about 350° F. and returned to the regenerator. The demetallization conditions chosen result in metal removal of about 70% and 22% for nickel and vanadium respectively.

It is claimed:

1. In the cracking of a plurality of mineral oil hydrocarbon charge stocks in the presence of a finely divided solid synthetic gel, silica-based cracking catalyst, at least one of said charge stocks being metal-contaminated and containing more than about 1.5 parts per million of vanadium and more than about 0.6 part per million of nickel and at least one of said charge stocks boiling in the gas oil range and being relatively metals-free, containing less than about 0.5 part per million of vanadium and less than about 0.2 part per million of nickel, the steps comprising conducting the cracking under flow conditions of progressive reaction in a reaction zone by contacting the catalyst under cracking conditions first with the said relatively contaminant-free charge stock in vapor form while flowing the catalyst and vapor in suspension through an elongated confined reaction flow path in the reaction zone, introducing said contaminated charge stock into the last one-fourth of said flow path to crack said contaminated stock and deposit metal poisons on the catalyst, separating catalyst from hydrocarbons at the end of the flow path and recovering hydrocarbon products, cycling the catalyst between the reaction flow path and a catalyst regeneration zone wherein carbon is burned from the catalyst, bleeding from the conversion system a portion of catalyst containing at least about 50 p.p.m. nickel and 50 p.p.m. vanadium, demetallizing bled catalyst and returning resulting dimetallized catalyst to the cracking flow path.

2. The process of claim 1 in which the contaminated charge stock contains more than about 4–10 p.p.m. nickel and more than about 5–20 p.p.m. vanadium and the amount of metals in the entire feed contacted by the catalyst in its passage through the reactor contains about 1–10 p.p.m. nickel and about 2–20 p.p.m. vanadium.

3. The process of claim 1 in which demetallizing includes contact of the catalyst with a vapor reactive with a metal contaminant.

4. The process of claim 1 wherein the metals contaminated charge stock is prepared by solvent deasphalting of an asphaltic residual oil.

5. The process of claim 1 in which the suspension of catalyst and vapor of contaminant-free charge stock has a density of about 5 to 10 pounds per cubic foot.

6. The process of claim 1 in which the suspension of catalyst and vapor contaminant-free charge stock flows at a linear velocity exceeding about 12 to 15 feet per second.

7. The process of claim 1 in which the flow of catalyst in cracking is upward.

8. The process of claim 1 in which the products from said cracking zone are fractionated and the fraction boiling above about 400° F. is cycled back to the cracking reaction by introduction into the flow path at a point in the reaction zone between catalyst introduction and metal-contaminated charge stock introduction.

9. The process of claim 1 in which the catalyst is regenerated to a carbon content of less than about 0.5% before demetallization.

10. The process of claim 1 in which the cracking conditions under which the contaminant-free charge stock is contacted with the catalyst substantially prevent coking.

11. The process of claim 1 in which the contaminated charge stock is introduced into the last one-fourth to one-eighth of the flow path.

12. The process of claim 1 in which the contaminated charge stock contains more than about 4–10 p.p.m. nickel and more than about 5–20 p.p.m. vanadium and the amount of metals in the entire feed contacted by the catalyst in its passage through the reactor contains about 1–10 p.p.m. nickel and about 2–20 p.p.m. vanadium.

13. In the cracking of a plurality of mineral oil hydrocarbon charge stocks in the presence of a finely-divided solid, synthetic gel, silica-alumina cracking catalyst, at least one of said charge stocks being metal-contaminated and containing more than about 1.5 p.p.m. of vanadium and more than 0.6 p.p.m. of nickel and at least one of said charge stocks boiling in the gas oil range and being relatively metals-free, containing less than about 0.5 p.p.m. of vanadium and less than about 0.2 p.p.m. of nickel, the steps comprising conducting the cracking under flow conditions of progressive reaction in a reaction zone by contacting the catalyst at a temperature of about 750 to 1050° F., a pressure of about atmospheric to 100 p.s.i.g., a catalyst-to-oil ratio of about 10/1 to 25/1, and a WHSV of about 5 to 60, said relatively contaminant-free charge stock in vapor form while flowing the catalyst and vapor in suspension through an elongated, confined reaction flow path in the reaction zone, introducing said contaminated charge stock into the last one-fourth of said flow path to crack said contaminated stock and deposit metal poisons on the catalyst, separating catalyst from hydrocarbons at the end of the flow path and recovering hydrocarbon products, the conversion of the feedstock into products boiling in the gasoline range being about 40 to 70%, cycling the catalyst between the reaction flow path and a catalyst regeneration zone wherein carbon is burned from the catalyst to a catalyst carbon content of less than about 0.5%, bleeding from the conversion system a portion of catalyst containing at least about 200 p.p.m. nickel and 500 p.p.m. vanadium, demetallizing bled catalyst to remove at least about 50% of the nickel and at least about 15% of the vanadium and returning resulting demetallized catalyst to the cracking flow path.

14. The process of claim 13 wherein demetallization of the contaminated catalyst is performed by contacting bled, substantially carbon-free catalyst with a molecular oxygen-containing gas at a temperature of at least about 1150° F., but below a temperature deleterious to the catalyst to increase subsequent vanadium removal from the catalyst, sulfiding oxygen-containing gas-treated catalyst by contact with a sulfiding vapor at a temperature of about 800 to 1500° F. to increase subsequent nickel removal from said catalyst, contacting the sulfided catalyst with a chlorinating agent at a temperature of up to about 1000° F. to convert vanadium and nickel to the chloride form and vaporize vanadium chloride, contacting chlorinating agent-treated catalyst with a liquid aqueous medium to dissolve nickel chloride from the catalyst.

References Cited by the Examiner
UNITED STATES PATENTS

| | | | |
|---|---|---|---|
| 2,488,744 | 11/49 | Snyder | 208—113 |
| 2,742,405 | 4/56 | Mattox | 208—74 |
| 2,893,943 | 7/59 | Vignovich | 208—113 |
| 2,902,432 | 9/59 | Codet et al. | 208—164 |
| 2,908,630 | 10/59 | Friedman | 208—74 |
| 2,925,374 | 2/60 | Gwin et al. | 208—86 |

ALPHONSO D. SULLIVAN, *Primary Examiner.*